(12) United States Patent
Jianping et al.

(10) Patent No.: US 7,126,586 B2
(45) Date of Patent: Oct. 24, 2006

(54) DATA INPUT DEVICES AND METHODS FOR DETECTING MOVEMENT OF A TRACKING SURFACE BY DETECTING LASER DOPPLER SELF-MIXING EFFECTS OF A FREQUENCY MODULATED LASER LIGHT BEAM

(75) Inventors: Xie Jianping, Hefei (CN); Ming Hai, Hefei (CN); Zhao Tianpeng, Hefei (CN); Lv Liang, Hefei (CN); Gui Huaqiao, Hefei (CN); Yuan Kong, Kirkland, WA (US); Craig S. Ranta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 10/944,099

(22) Filed: Sep. 17, 2004

(65) Prior Publication Data

US 2006/0072102 A1   Apr. 6, 2006

(51) Int. Cl.
*G09G 5/00* (2006.01)
(52) U.S. Cl. ............... 345/166; 345/156; 250/221; 356/496
(58) Field of Classification Search ........... 345/156, 345/157, 163, 166, 179; 250/221; 356/28, 356/496; 382/312, 313
See application file for complete search history.

(56) References Cited

U.S. PATENT DOCUMENTS

| 4,154,669 | A | 5/1979 | Goetz |
| 4,299,484 | A | 11/1981 | Holzapfel |
| 4,364,035 | A | 12/1982 | Kirsch |
| 4,387,993 | A | 6/1983 | Adrian |
| 4,391,515 | A | 7/1983 | Forrester et al. |
| 4,470,696 | A | 9/1984 | Ballard |
| 4,552,456 | A | 11/1985 | Endo |
| 4,569,588 | A | 2/1986 | Nishiwaki et al. |
| 4,719,455 | A | 1/1988 | Louis |
| 4,794,384 | A | 12/1988 | Jackson |
| 4,822,164 | A | 4/1989 | Breen |

(Continued)

FOREIGN PATENT DOCUMENTS

EP    0295720 A2    12/1988

OTHER PUBLICATIONS

Asakura et al., *Dynamic Laser Speckles and Their Application to Velocity Measurements of the Diffuse Object*, Applied Physics, 1981, 179-194.

(Continued)

*Primary Examiner*—Regina Liang
(74) *Attorney, Agent, or Firm*—Senniger Powers

(57) ABSTRACT

A data input device for use with a tracking surface having light-scattering properties with respect to the device. The device comprising a single laser having a modulated light beam. A beam splitter splits the modulated light beam into two light beams projected along separate paths toward the tracking surface. A portion of the light striking the tracking surface reflects back into a cavity of the single laser for self-mixing with the projected light, thereby altering first and second characteristics of the projected modulated light beam according to first and second directions associated with the tracking surface. A detector associated with the laser detects the altered first and second characteristics of the modulated light beam projected by the laser, and a controller responsive to the detector determines the relative movement of the tracking surface and data input device relative to one another as a function of the altered first and second characteristics detected by the detector.

38 Claims, 9 Drawing Sheets

U.S. PATENT DOCUMENTS

| | | | |
|---|---|---|---|
| 4,856,899 A | 8/1989 | Iwaoka et al. |
| 4,861,158 A | 8/1989 | Breen |
| 4,902,125 A | 2/1990 | Keene et al. |
| 4,919,532 A | 4/1990 | Mocker et al. |
| 4,963,498 A | 10/1990 | Hillman et al. |
| 5,064,280 A | 11/1991 | Ringens et al. |
| 5,070,483 A | 12/1991 | Berni |
| 5,123,730 A | 6/1992 | Holmes et al. |
| 5,164,733 A | 11/1992 | Nettleton et al. |
| 5,170,218 A | 12/1992 | Keene |
| 5,194,906 A | 3/1993 | Kimura et al. |
| 5,216,478 A | 6/1993 | Kadowaki et al. |
| 5,229,830 A | 7/1993 | Ishida et al. |
| 5,268,739 A | 12/1993 | Martinelli et al. |
| 5,271,675 A | 12/1993 | Fagan et al. |
| 5,274,361 A | 12/1993 | Snow |
| 5,296,910 A | 3/1994 | Cole |
| 5,323,223 A | 6/1994 | Hayes |
| 5,325,175 A | 6/1994 | Mocker et al. |
| 5,428,438 A | 6/1995 | Komine |
| 5,489,900 A | 2/1996 | Cali et al. |
| 5,552,879 A | 9/1996 | Takamiya et al. |
| 5,557,407 A | 9/1996 | Takamiya et al. |
| 5,574,480 A | 11/1996 | Pranger |
| 5,587,785 A | 12/1996 | Kato et al. |
| 5,617,199 A | 4/1997 | Dunne |
| 5,644,139 A | 7/1997 | Allen et al. |
| 5,682,236 A | 10/1997 | Trolinger et al. |
| 5,684,572 A | 11/1997 | Bëtefisch |
| 5,694,123 A | 12/1997 | Selker et al. |
| 5,696,578 A | 12/1997 | Ishida et al. |
| 5,774,218 A | 6/1998 | Takamiya et al. |
| 5,812,250 A | 9/1998 | Ishida et al. |
| 5,814,732 A | 9/1998 | Nogami |
| 5,835,199 A | 11/1998 | Phillips et al. |
| 5,875,024 A | 2/1999 | Seelhorst et al. |
| 6,031,218 A | 2/2000 | Piot et al. |
| 6,034,760 A | 3/2000 | Rees |
| 6,040,899 A | 3/2000 | Breda |
| 6,057,540 A | 5/2000 | Gordon et al. |
| 6,064,472 A | 5/2000 | Drewling |
| 6,115,121 A | 9/2000 | Erskine |
| 6,233,045 B1 | 5/2001 | Suni et al. |
| 6,246,482 B1 | 6/2001 | Kinrot et al. |
| 6,285,288 B1 | 9/2001 | Langdon et al. |
| 6,323,943 B1 | 11/2001 | Maruyama et al. |
| 6,323,949 B1 | 11/2001 | Lading et al. |
| 6,448,977 B1 | 9/2002 | Braun et al. |
| 6,452,683 B1 | 9/2002 | Kinrot et al. |
| 6,455,840 B1 | 9/2002 | Oliver et al. |
| 6,469,778 B1 | 10/2002 | Asaka et al. |
| 6,507,391 B1 | 1/2003 | Riley et al. |
| 6,531,692 B1 | 3/2003 | Adan et al. |
| 6,532,061 B1 | 3/2003 | Ortyn et al. |
| 6,542,227 B1 | 4/2003 | Jamieson et al. |
| 6,556,282 B1 | 4/2003 | Jamieson et al. |
| 6,580,497 B1 | 6/2003 | Asaka et al. |
| 6,665,063 B1 | 12/2003 | Jamieson et al. |
| 6,707,027 B1 | 3/2004 | Liess et al. |
| 6,759,671 B1 | 7/2004 | Liess et al. |
| 6,778,263 B1 | 8/2004 | Ortyn et al. |
| 2002/0122167 A1 | 9/2002 | Riley et al. |
| 2002/0145588 A1 | 10/2002 | McCahon et al. |
| 2003/0043364 A1 | 3/2003 | Jamieson et al. |
| 2003/0103037 A1 | 6/2003 | Rotzoll |
| 2003/0142289 A1 | 7/2003 | Ortyn et al. |
| 2004/0061680 A1 | 4/2004 | Taboada |
| 2004/0109155 A1 | 6/2004 | Deines |
| 2005/0035947 A1 | 2/2005 | Lutian |
| 2005/0134556 A1* | 6/2005 | VanWiggeren et al. ..... 345/156 |

OTHER PUBLICATIONS

Duijve et al., A Compact, *Laser-based Optical Scrolling Device*, Philips Centre For Industrial Technology, Eindhoven, the Netherlands.

Ohtsubo et al., *Velocity Measurement of a Diffuse Object by Using Time-Varying Speckles,* Optical and Quantum Electronics, 1976, pp. 523-529, Chapman and Hall Ltd., Great Britain.

*Optical Mouse Saves Space,* The Online Photonics Resource, http://optics.org, Dec. 8, 2003, 2 pp., United States.

*Optical Scrolling,* The Online Photonics Resource, http://optics.org, Dec. 8, 2003, 1 pg., United States.

*Prototype Device,* The Online Photonics Resource, http://optics.org, Dec. 8, 2003, 1 pg., United States.

Schnell et al., *Detection of Movement with Laser Speckle Patterns: Statistical Properties,* Optical Society of America, Jan. 1998, pp. 207-216, vol. 15, No. 1.

Shinohara et al., *Coherence Dependence of Fiber-Optic Laser Doppler Velocimeter output using Self-Mixing Laser Diode,* Instrumentation and Measurement Technology Conference Record, May 1993, pp. 420-425, IEEE.

Wang, et al., *Self-Mixing Interference Inside a Single Mode Diode Laser for Optical Sensing Applications,* Journal of Lightwave Technology, Sep. 1994, vol. 12, No. 9, London, England.

\* cited by examiner $|\Delta v_1 - v_{Dx}| |\Delta v_1 + v_{Dx}|$ $|\Delta v_2 - v_{Dy}| |\Delta v_2 + v_{Dy}|$

DATA INPUT DEVICES AND METHODS FOR DETECTING MOVEMENT OF A TRACKING SURFACE BY DETECTING LASER DOPPLER SELF-MIXING EFFECTS OF A FREQUENCY MODULATED LASER LIGHT BEAM

TECHNICAL FIELD

Embodiments of the present invention relate to the field of computer input devices, and particularly data input devices, such as a mouse, trackball, joystick, touch pad, or a touch-sensitive post. In particular, embodiments of this invention relate to data input devices for use with a tracking surface having light-scattering properties, the device comprising a single laser having a cavity from which a light beam is projected, a light beam modulator for modulating the frequency of the light beam over time, a beam splitter for splitting the modulated light beam into a first modulated light beam projected along a first light path and a second modulated light beam projected along a second light path, reflections of the light beams altering respective first and second characteristics of the projected modulated light beam, a detector associated with the laser for detecting the altered first and second characteristics, and a controller responsive to the detector for determining the relative movement of the tracking surface and data input device relative to one another as a function of the altered first and second characteristics detected by the detector.

INCORPORATION BY REFERENCE

The following U.S. patent is hereby fully incorporated by reference: U.S. Pat. No. 6,531,692 B1 issued to Adan et al., entitled "OPTICAL COUPLING ASSEMBLY FOR IMAGE SENSING OPERATOR INPUT DEVICE", and assigned to Microsoft Corporation.

The following U.S. patent application is hereby fully incorporated by reference: U.S. patent application Ser. No. 10/761,855 invented by Kong, entitled "DATA INPUT DEVICE AND METHOD FOR DETECTING LIFT-OFF FROM A TRACKING SURFACE BY LASER DOPPLER SELF-MIXING EFFECTS", filed Jan. 21, 2004, assigned to Microsoft Corporation.

BACKGROUND OF THE INVENTION

Previous computer input devices, such as mice or trackballs, include rotatable balls mounted within a housing, yet rotatably engaging a surface. As the ball of such a device translates across the surface, the ball rotates within the housing, engaging horizontal and vertical wheels that rotate against the ball, thereby indicating horizontal and vertical movement of the surface. Building upon these primarily mechanical tracking devices, optical tracking devices have become available. Such devices optically track movement of a surface, rather than mechanically as with the devices described immediately above. These optical systems typically do not require wheels in contact with a movable ball, which may act as a common collection point for dust and dirt. But such devices lack the ability to track on any surface, requiring a suitable frictional interface between the ball and the surface. Moreover, these devices still require one moving part, the ball. In addition, aliasing artifacts may cause the cursor to skip, rather than move fluidly during rapid motion of the device.

Still other optical devices place the pattern on the tracking surface (e.g., a mouse pad), rather than on the rotatable ball, thereby using the mouse pad to generate optical tracking information. Although such devices are able to eliminate the moving ball, they are less universal by requiring a specific tracking surface to operate.

Other more recent optical tracking devices have emerged that have eliminated the need for a patterned ball or mouse pad. One such device utilizes an LED to project light across the tracking surface at a grazing angle to the tracking surface. The mouse then collects tracking information by detecting dark shadows cast by high points in the surface texture, which appear as dark spots. This device eliminates the moving ball of previous devices, and is useful on a variety of surfaces. However, smooth or glossy surfaces may prove difficult to track upon, because they may generate no shadows from texture and present a low contrast image that may not provide adequate features upon which to track.

Other devices have been developed for tracking movement of a tracking surface, wherein the tracking surface is a finger of the user. Such devices are particularly useful in handheld and laptop devices, such as personal digital assistants, cellular phones, laptop computers, as well as any other electronic device where it is desirable to locate a data input device on the device itself, for interaction with a tracking surface comprising human skin, such as a fingertip. For example, some devices include an upwardly extending post mounted on several force sensors. As the user places a finger upon the top of the post and applies pressure in any direction, the resultant forces on the force sensors may be correlated to movement of a cursor, or pointer, on a display. Such systems suffer from several drawbacks. For example, such systems do not track the actual location information relating to the location of the user's moving hand and finger with respect to the device, but instead merely rely upon merely directional information to indicate the direction of cursor movement on the display and force information to indicate the proportional speed of cursor movement on the display. In other words, while maintaining a fingertip in one position, the user increases pressure on the post in a particular lateral direction to move the cursor. These systems may be difficult to use for some users because they function solely on direction and force information, rather than position information, as is typical with a standard mouse, with which most users are accustomed and may find more intuitive. In addition, such systems may suffer from cursor drift, wherein no finger engages the post, but one or more of the force sensors incorrectly senses a pressure. The cursor then drifts across the display, rather than maintaining its position, without any finger pressure applied to the post. Cursor drift is undesirable because the cursor moves across the display, without direction by the user.

Still other devices have utilized a laser phenomenon known as Doppler self-mixing to track movement of a tracking surface relative to a device. Such systems perform well on glossy surfaces and may have higher potential resolution than the surface imaging systems discussed previously. Such devices require a laser corresponding to each direction sought to be tracked. For example, for two-dimensional tracking, an x-direction laser and a y-direction laser are both required. For three-dimensional tracking, three separate lasers are required, one for the x-direction, one for the y-direction, and one for the z-direction. Utilizing a separate laser for each tracking direction is undesirable because of the additional hardware cost and packaging required for an additional laser or lasers. A device utilizing the Doppler self-mixing phenomenon for tracking in multiple directions with a single laser is therefore desirable.

SUMMARY OF THE INVENTION

Accordingly, a data input device for use with a tracking surface having light-scattering properties with respect to the device—the device comprising a single laser having a modulated light beam split into two beams projecting and reflecting along separate light paths to self-mix in a cavity of the single laser for determining the relative movement of the tracking surface and data input device relative to one another as a function of altered first and second characteristics of the modulated light beam—is desired to address one or more of these and other disadvantages. For example, such a device may be well-suited for replacement of an upwardly extending post or touch pad, generally as set forth above. Such a device may also be well-suited for replacement of a mouse or trackball, generally as described above.

In accordance with one aspect of the invention, a data input device for use with a tracking surface having light-scattering properties with respect to the device comprises a single laser having a cavity from which a light beam is projected. A light beam modulator modulates the frequency of the light beam over time, and a beam splitter splits the modulated light beam into a first modulated light beam and a second modulated light beam. The beam splitter being configured to project the first modulated light beam onto the tracking surface along a first light path, whereby at least a portion of the first modulated light beam striking the tracking surface reflects back into the cavity of the laser along the first light path, thereby altering at least one first characteristic of the projected modulated light beam. The beam splitter further being configured to project the second modulated light beam onto the tracking surface along a second light path, whereby at least a portion of the second modulated light beam striking the tracking surface reflects back into the cavity of the laser along the second light path, thereby altering at least one second characteristic of the projected modulated light beam. A detector is associated with the laser for detecting the altered first and second characteristics of the modulated light beam projected by the laser. A controller is responsive to the detector for determining the relative movement of the tracking surface and data input device relative to one another as a function of the altered first and second characteristics detected by the detector.

In accordance with still another aspect of the present invention, a method of tracking relative movement on a tracking surface having light scattering properties comprises modulating the frequency of a light beam over time, the light beam being projected from a single laser cavity. The method further comprises splitting the modulated light beam into a first modulated light beam and a second modulated light beam, projecting the first modulated light beam onto the tracking surface along a first light path, and projecting the second modulated light beam onto the tracking surface along a second light path. The method additionally comprises receiving at least a portion of the first modulated light beam reflected by the tracking surface along the first light path within the laser cavity and receiving at least a portion of the second modulated light beam reflected by the tracking surface along the second light path within the laser cavity. The method further comprises mixing the received reflected light portions with light generated within the laser cavity, the mixing thereby altering at least one first characteristic of the projected modulated light beam due to the received reflected portion of the first modulated light beam and altering at least one second characteristic of the projected modulated light beam due to the received reflected portion of the second modulated light beam. A modulated light beam with the at least one first and at least one second altered characteristics is projected from the laser cavity. The method also comprises detecting the at least one first altered characteristic of the modulated light beam, detecting the at least one second altered characteristic of the modulated light beam, and determining movement of the tracking surface and the single laser cavity relative to one another as a function of the detected altered first and second characteristics.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
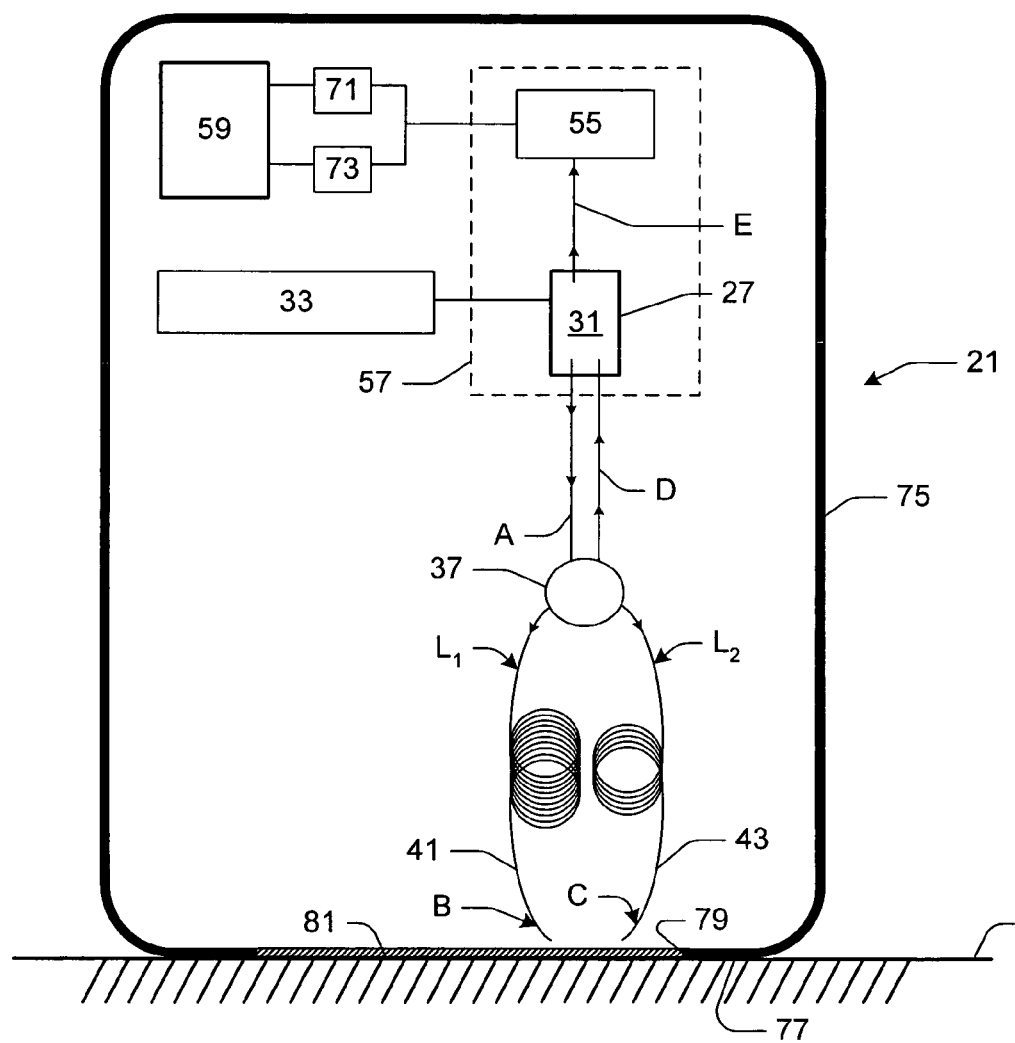
FIG. 1 is a schematic of a data input device of the present invention contacting a tracking surface.

In one embodiment, the invention includes a data input device for use with a tracking surface that is optically rough, or in other words, has light-scattering properties with respect to the device, to track relative movement between the device and the tracking surface. FIG. 1 is a schematic of such a data input device, generally indicated 21, and tracking surface 25 of the present invention. The data input device 21 comprises a single laser 27 having a cavity 31 for projecting a light beam A. The data input device 21 further comprises a light beam modulator 33 for modulating the frequency of the light beam A over time (e.g., FIG. 7). In one example, the light beam modulator 33 modulates the light beam A in a time-based pattern, such as the triangular time-based pattern depicted in FIG. 7. In one example, the light beam modulator 33 comprises a current modulator for modulating the current supplied to the single laser 27. By modulating the current of the laser 27, the frequency output of the laser is thereby modulated accordingly. Throughout the specification, reference to "light beam", "modulated light beam", and "frequency modulated light beam" each refer to a light beam A modulated by the light beam modulator 33 and having a varying frequency over time.

The data input device 21 further comprises a beam splitter 37 in the path of the modulated light beam A for splitting the modulated light beam from the single laser 27 into a first modulated light beam, generally indicated B, and a second modulated light beam, generally indicated C (FIG. 1), hereinafter first light beam and second light beam. The beam splitter 37 is configured to project the first light beam A onto the tracking surface 25 along a first light path, generally indicated $L_1$, such that at least a portion of the first light beam strikes the tracking surface. The tracking surface 25 scatters the first light beam A and reflects at least a portion of the reflected light D back into the cavity 31 of the laser 27 along the first light path $L_1$. By returning a reflected portion D of the first light beam B to the cavity 31 of the single laser 27, at least one first characteristic of the projected first light beam may be altered due to self-mixing.

The beam splitter 37 is further configured to project the second light beam C onto the tracking surface 25 along a second light path, generally indicated $L_2$, such that at least a portion D of the second light beam reflects back into the cavity 31 of the laser 27 along the second light path (FIG. 1). As with the first light beam B, by returning a reflected portion D of the second light beam C to the cavity 31 of the single laser 27, at least one second characteristic of the projected second light beam may be altered due to self-mixing.

Mixing of the reflected light beam D with the light generated within the cavity 31 of the single laser 27 is known generally in the art as self-mixing. Self-mixing is well documented in scientific literature (e.g., Wang et al., *Self-Mixing Interference Inside a Single-Mode Diode Laser for Optical Sensing Applications*, JOURNAL OF LIGHTWAVE TECHNOLOGY 1577–1587, Vol. 12, No. 9, 1994.) and will not be discussed in great detail here. Suffice it to say that mixing of laser light backscattered (i.e., reflected back) from the tracking surface 25 and into the cavity 31 of the single laser 27 will alter the output of light beam A, and E, of the laser. By detecting even small changes in the output of the single laser 27, the movement of the tracking surface 25 relative to the laser cavity 31, and in turn the device 21 itself, may be understood. Once this relative movement is understood in real time, both the speed and the position of the laser 27 and thus the device 21, relative to the tracking surface 25 may be readily ascertained, as will be discussed below in greater detail.

It should be noted that the device 21 may incorporate one of a variety of different single lasers 27, as long as the lasers are capable of exhibiting the self-mixing phenomenon. Particular single lasers 27 (e.g., semiconductor vertical cavity surface emitting lasers (VCSELs)), will draw very little power and may be used in battery-operated devices, such as laptop computers and handheld electronic devices, which must operate efficiently. For instance, a suitable laser 27 draws less than about 1.0 mW (1.3 μhorsepower) of power. In addition, a suitable laser 27 (e.g., a VCSEL) may be relatively small in size, easing packaging considerations, and relatively inexpensive to manufacture, easing cost considerations. This ensures that the laser 27 may be used in a cordless device application without unduly limiting the battery life of the device or interfering with packaging considerations. Moreover, maintaining the power of the laser 27 at a relatively low level ensures that the laser does not present an eye hazard for the user. In particular, the laser 27 may also be a solid-state device, such as a VCSEL or an edge-emitting laser diode (EEL). A gas-based laser, such as a Helium-Neon (He—Ne) laser, may also be used. Other lasers and sources of laser, or coherent, light capable of exhibiting self-mixing phenomena may also be utilized without departing from the scope of the claimed invention.

Returning to the first and second light beams B,C and their travel from the laser 27 to the tracking surface 25, the first light beam B travels a first distance along the first light path $L_1$ between the beam splitter and the tracking surface, and the second light beam C travels a second distance along the second light path $L_2$ between the beam splitter 37 and the tracking surface. In one example, the first and second distances are different from one another, thereby allowing the self-mixing signals generated by each light beam B,C to be distinguished from one another, the details of which will be explained in greater detail below in this detailed description and in Appendix A. In another example, the first distance is at least 1.2 times the second distance. In yet another example, the first distance is in a range from about 1.2 times to about 1.8 times the second distance. In still another example, the first distance is in a range from about 1.4 times to about 1.6 times the second distance. In yet another example, the first distance is in a range from about 1.45 times to about 1.55 times the second distance. In still another example, the first distance is about 1.5 times the second distance. The length of such distances may be greater than one, two, or more meters. Again, the significance of such distance differences will be discussed in greater detail below.

Figure 5:
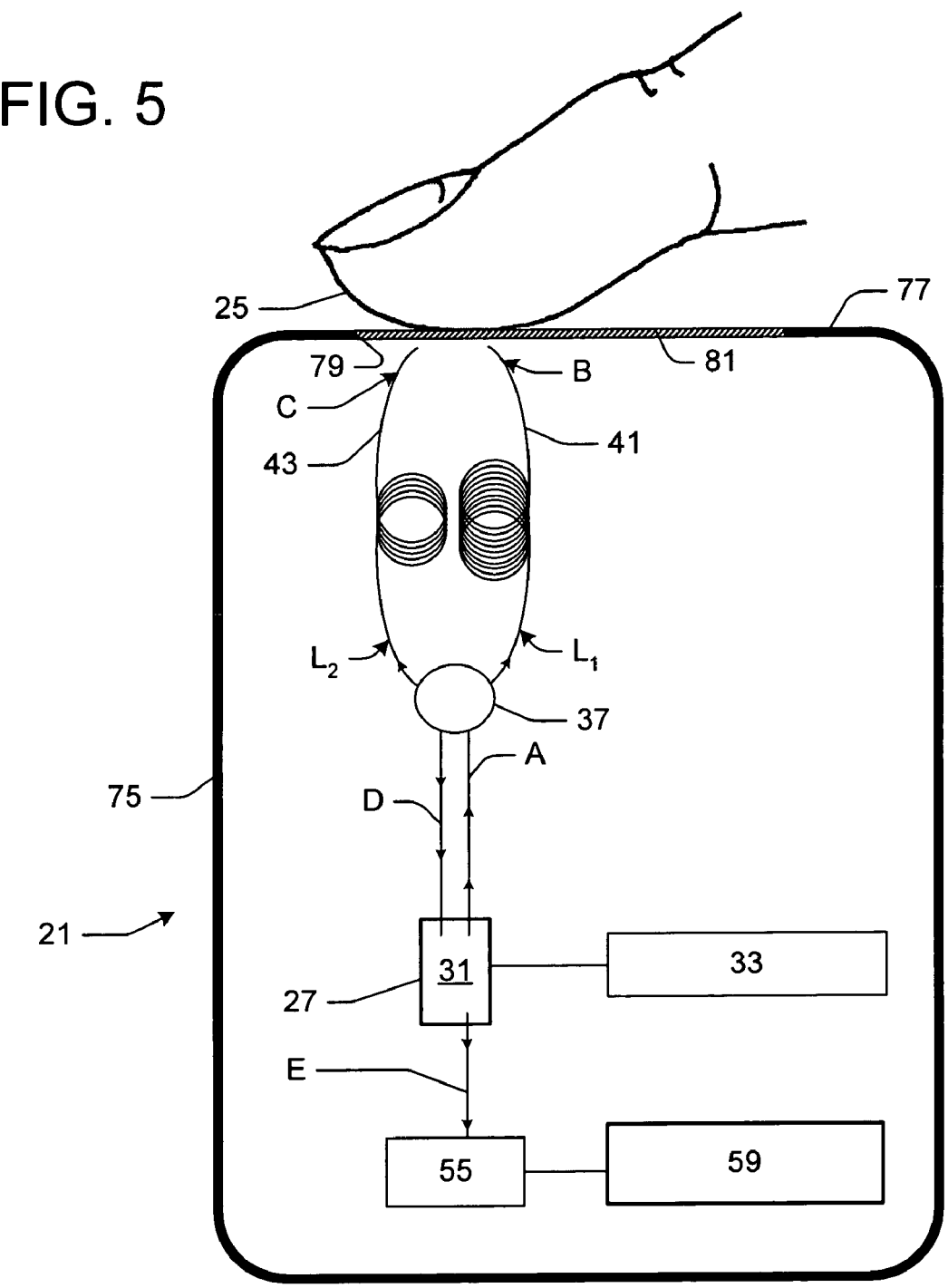
FIG. 5 is a schematic of yet another data input device of the present invention wherein the tracking surface is human skin.

The device 21 may also comprise one or more devices to cause the first and second distances to be different from one another, as described above. The transmission medium of the first and second light beams B,C through such devices may be through solid or free space. For example, the beam splitter 37 may further comprise at least two fiber optic strands, a first fiber optic strand 41 carrying the first light beam B and a second fiber optic strand 43 carrying the second light beam C (FIGS. 1 and 5). The first and second distances may be fixed by selecting a fiber optic strand of appropriate length. In order to accommodate relatively long fiber optic lengths (e.g., over 1 meter (3.3 feet)), the fiber optic strands 41,43 may include several loops, or may be otherwise circuitously routed, to provide a relatively long light path in a relatively small volume.

Figure 6:
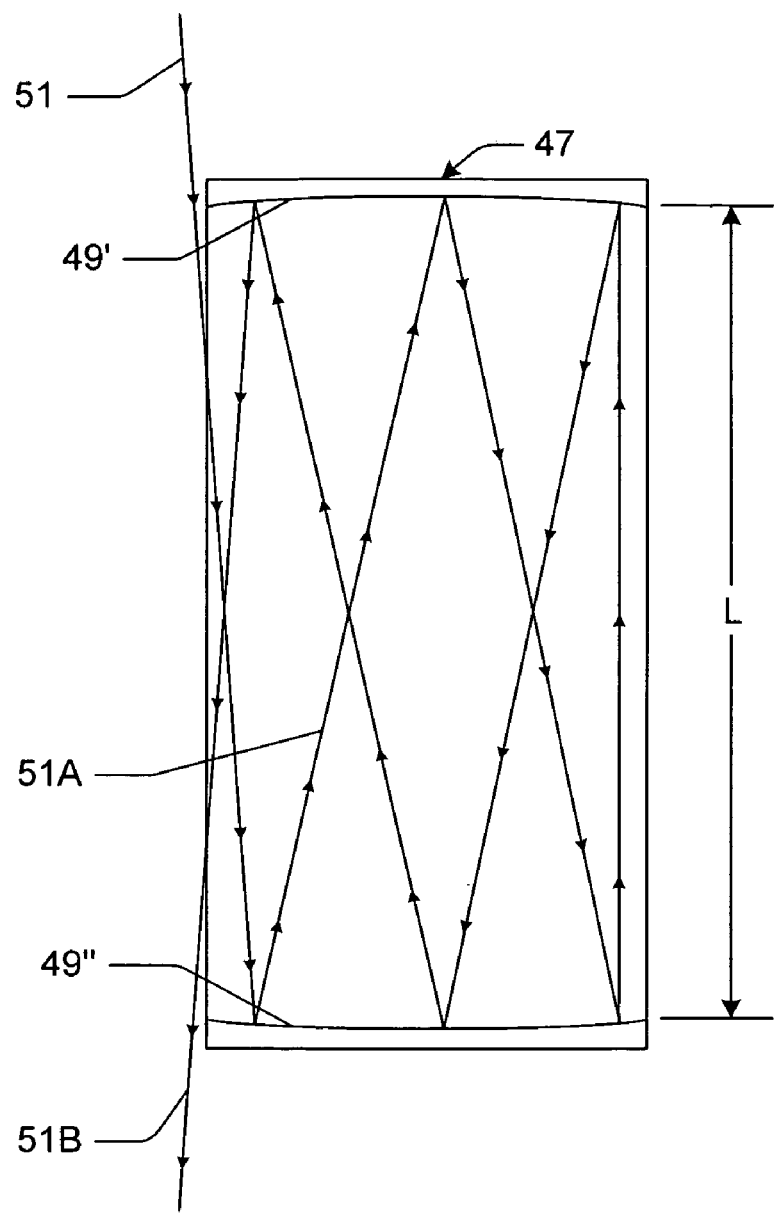
FIG. 6 is a schematic of a multi-reflection cell for use with still another data input device of the present invention.

Alternately, the device 21 may comprise a multi-reflection cell, generally indicated 47, for increasing the length of at least one of the first and second distances (FIG. 6). A multi-reflection cell 47, or White cell, uses mirrors to increase the path length of a light beam. In the example shown in FIG. 6, the multi-reflection cell 47 includes two opposed concave mirrors 49. The light beam 51 entering the multi-reflection cell 47 is reflected from the bottom mirror 49" toward the top mirror 49'. The top mirror then reflects the light beam 51A back toward the bottom mirror 49". The top and bottom mirrors 49 continue to reflect the light beam 51 back and forth until the top mirror 49' reflects the light beam 51B downward and out of the multi-reflection cell 47. In the example shown, the light beam 51 travels between the top and bottom mirrors 49 seven times, thereby increasing the distance the light beam travels from the length of the cell L, to about seven times the length of the cell. Other cells creating a greater or fewer number of reflected path lengths are also contemplated as within the scope of the claimed invention.

The device 21 further comprises a detector 55 associated with the single laser 27 for detecting the modulated light beam E projected by the laser and having the at least one first and the at least one second altered characteristics (FIG. 1). The detector 55 and single laser 27 may be mounted separately in the device 21 as depicted in FIG. 5, or the laser and the detector may be mounted adjacent each other on a substrate 57, such as a micro-chip, a printed circuit board (PCB) or a leadframe, as depicted in FIG. 1. Many such single lasers 27 include a detector 55 within the laser itself for use in monitoring intensity of the laser light beam E. When available with the laser 27 itself, such detectors 55 may be utilized rather than adding an entirely new detector for use with the laser, although either configuration is contemplated as within the scope of the claimed invention. Detectors 55 may include photodetectors, CCDs (charge-coupled devices), CMOS (complementary metal-oxide semiconductor) technology or other detector arrays that are capable of both the bandwidth and spectral requirements mandated by the laser 27.

The device 21 further comprises a controller 59 responsive to the detector 55 for determining the relative movement of the tracking surface 25 and data input device 21 relative to one another as a function of the altered first and second characteristics detected by the detector (FIG. 1). The at least one first and second altered characteristics of the light beam E projected from the cavity 31 of the single laser 27 may comprise frequency changes in a Doppler waveform of the projected light beam of the laser. These changes may be utilized by the controller 59 to determine relative movement between the device 21 and the tracking surface 25, as discussed in greater detail below.

Although the first and second light beams B,C may be at many different angular orientations with respect to the tracking surface 25 and still return sufficient scattered light to the single laser 27, the orientations of the first and second light beams with respect to the tracking surface are important considerations in designing the device 21. In particular, in one example the first light beam B strikes the tracking surface at an azimuth angle α relative to the second light beam C, as depicted in the top view of FIG. 2. This allows the first and second light beams B,C to identify relative motion between the device 21 and the tracking surface 25 in different directions, corresponding to the orientation of the first light beam and the orientation of the second light beam.

In another example, the azimuth angle α is between about 1.05 radians (60 degrees) and about 2.09 radians (120 degrees). In still another example, the azimuth angle α is about 1.57 radians (90 degrees). By setting a different orientation for each light beam B,C, the two relative directions may be ascertained. For example, with an azimuth angle of 1.57 radians (90 degrees), the device 21 can determine movement in an x-direction and y-direction. By combining these movements, the overall relative movement between the device 21 and the tracking surface 25 may be ascertained by the device, as will be discussed in detail below.

Figure 2:
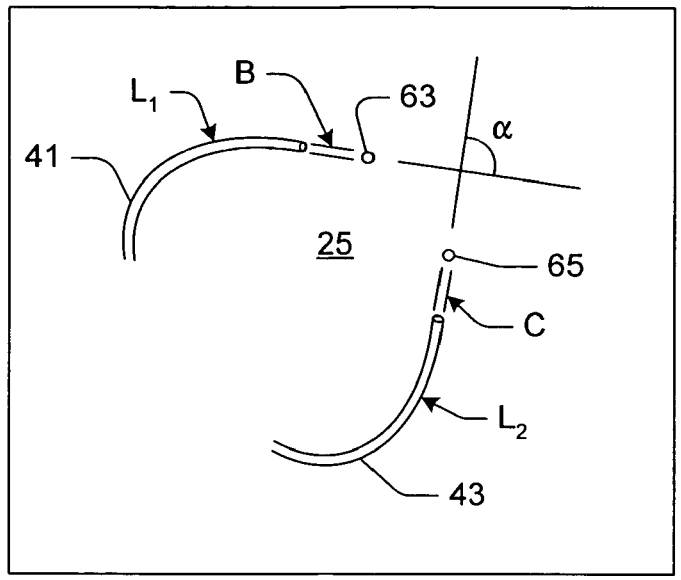
FIG. 2 is a plan view of an azimuth angle between first and second light beams of one example of a data input device.

In addition to providing tracking information in different directions, the orientation of the first and second light beams B,C also minimizes cross-talk between the first and second light beams by illuminating two distinct locations, or spots, on the tracking surface 25. In particular, the first light beam B illuminates a first light spot 63, while the second light beam C illuminates a second light spot 65, as shown in FIG. 2. These spots 63,65 are positioned at different locations on the tracking surface 25, such that reflected light from the first light beam B is not reflected into the second light path $L_2$, and vice-versa. Because the first and second beams' frequencies are modulated by the same triangular current, any backscattered light from the first light beam B reflected along the second light path $L_2$ will create unwanted cross-talk in the processing of the second light beam C, and vice-versa. By focusing the first and second light beams B,C onto two distinct spots 63,65, cross-talk between the first and second light beams B,C is minimized, thereby improving the ability of the device 21 to track movement in each direction independently.

Figure 3:
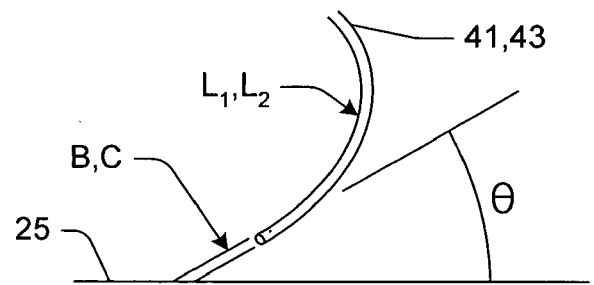
FIG. 3 is a elevation of an elevation angle between a light beam and the tracking surface of one example of a data input device.

In addition to the azimuth angle α between the first and second beams B,C, the first and second beams may also be oriented at elevational angles θ relative to the tracking surface 25 (FIG. 3). In one example, at least one of the first and second light beams B,C strikes the tracking surface 25 at an elevation angle θ between about 0.17 radian (10 degrees) and about 1.40 radians (80 degrees). In another example, the elevation angle θ is between about 0.35 radian (20 degrees) and about 1.05 radian (60 degrees). In yet another example, the elevation angle θ is between about 0.35 radian (20 degrees) and about 0.79 radian (45 degrees). In still another example, the elevation angle θ is about 0.52 radian (30 degrees).

Many different tracking surfaces 25 of differing materials and finishes will reflect a sufficient amount of the first and second light beams B,C back to the laser cavity 31 because the surfaces are optically rough, having adequate light-scattering properties with respect to the device 21. An optically rough surface scatters laser light in many directions, making the orientation of the light beam with respect to the tracking surface 25 relatively unimportant, with respect to having adequate light reflected back upon the appropriate light path. For example, for most tracking surfaces 25, the first and second light beams B,C each may be oriented at any angle relative to the tracking surface (e.g., the elevation angle θ) because the optically rough tracking surface backscatters each of the light beams in many directions, including back along the first and second light paths. With respect to sufficient scattered light, the orientation of the first and second light beams B,C, therefore, is relatively unimportant, as long as the first and second light paths $L_1,L_2$ each receive a small portion of the respective light beams reflected from the tracking surface 25 to the cavity 31. For example, optically rough surfaces include many common tracking surfaces 25, including paper, wood, metal, fabric, certain plastics and human skin. Only surfaces that are perfectly reflective, i.e., mirror-like, such as a ground and polished, optic-quality, flat, transparent glass, are insufficiently rough to backscatter laser light in many directions. Such surfaces that are not optically rough will act as a mirror and only reflect laser light exactly opposite the angle of incidence of the light beam.

Figure 4:
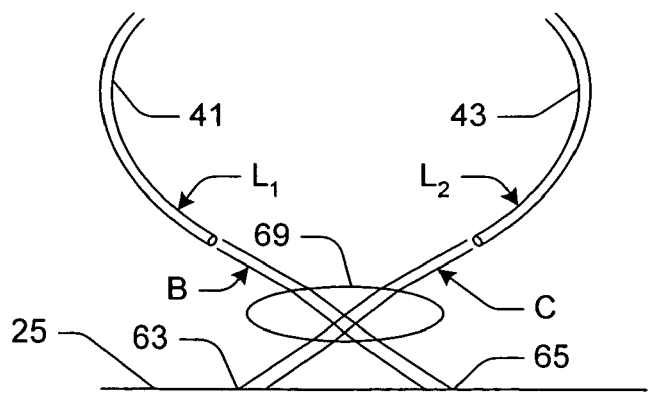
FIG. 4 is an elevation of another embodiment of the data input device of the present invention comprising an optic.

In another example of the device depicted in FIG. 4, the device 21 may further comprise an optic 69 is positioned between the fiber optic strands 41,43 and the tracking surface 25 for refracting the first and second light beams B,C between to spots 63,65 on the tracking surface. The optic 69 may be of any suitable type (e.g., bi-convex and plano-convex, aspherical lens) and its aim is to control the first and second light beams B,C to further minimize cross-talk, as discussed above. As would be readily understood by one skilled in the art, other optics, such as those including more than one lens, non-aspherical lenses, and other types of lenses altogether are also contemplated as within the scope of the claimed invention. In addition, utilizing an optic 69 may allow for different packaging configurations of the first and second light paths B,C.

Figure 8:
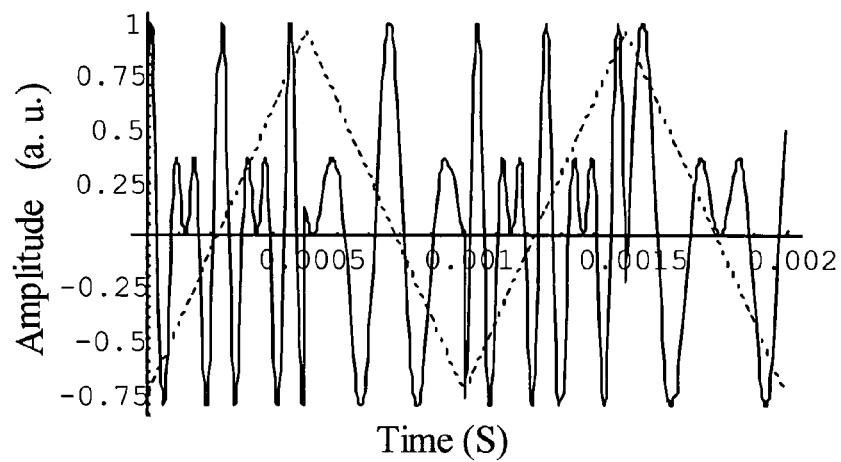
FIG. 8 is an example of a frequency wave of a projected laser light beam having at least one first altered characteristic and at least one second altered characteristic.
Figure 9:
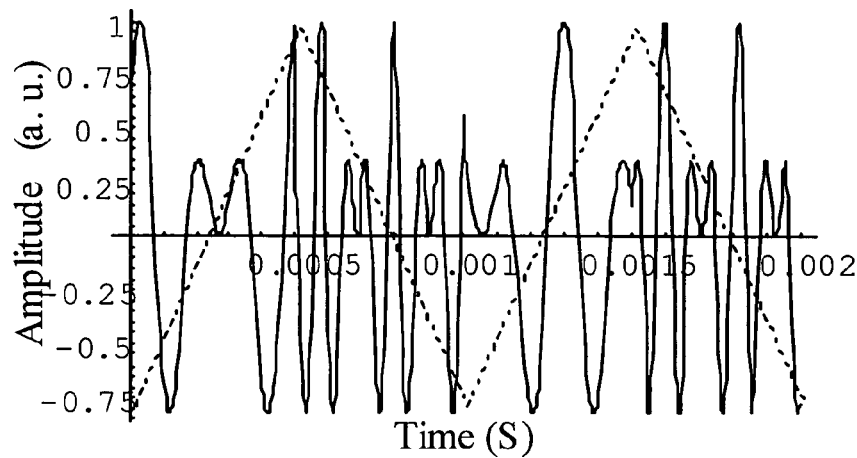
FIG. 9 is another example of a frequency wave of a projected laser light beam having at least one first altered characteristic and at least one second altered characteristic.

As shown in FIG. 1, the device 21 further comprises a first filter 71 and a second filter 73 for filtering the Doppler waveform of the projected light beam E. Both filters 71,73 filter the same input signal, namely the Doppler waveform associated with the projected light beam E, during self-mixing of the single laser 27. Examples of such unfiltered Doppler waveforms are depicted in FIGS. 8 and 9, wherein the x-axis indicates time in seconds and the y-axis indicates amplitude with an arbitrary unit (e.g., millivolts, milliamps). The unfiltered waveforms exhibit frequency characteristics associated with both light beams B,C, and therefore both ordinate directions, x and y. Because Doppler frequency responses from both directions are included in the unfiltered signals, filtration is required to determine the relative contribution for each direction. For filtration to be effective in isolating the first and second altered characteristics, the relative contributions of the first and second light beams B,C must be frequency separated over different frequency ranges. This frequency shift between the first and second light beams B,C may be readily accomplished by designing the first and second light paths $L_1, L_2$ to be different lengths, as discussed above. By establishing different light path lengths, the first and second light beams B,C will correspond to different frequency ranges. Thus, filters 71,73 capable of removing particular frequency ranges from the combined Doppler frequency response are readily capable of isolating one of the first or second altered characteristics. An explanation of one technique for determining an appropriate light path length is set forth in detail below in Appendix A, although other techniques are also contemplated as within the scope of the claimed invention.

Figure 8A:
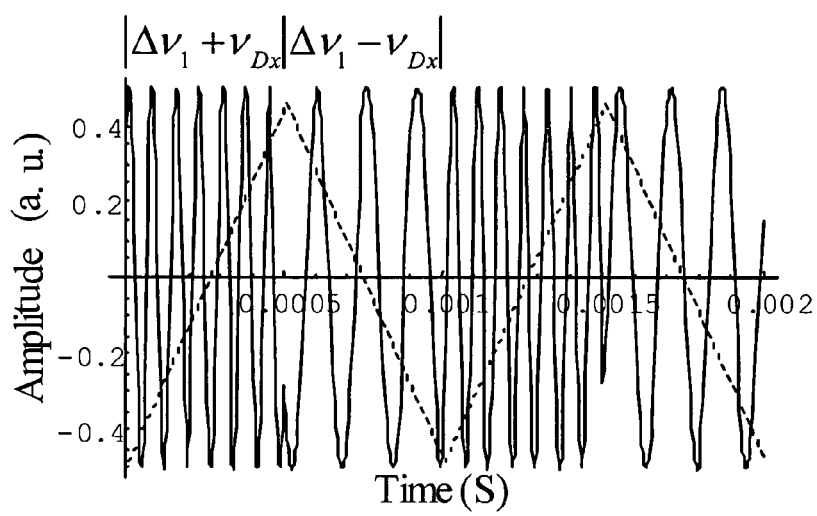
FIG. 8A is an example of the frequency wave of FIG. 8 with frequency shifts corresponding to the second altered characteristic of the light beam filtered out, thereby revealing a filtered Doppler waveform of the first altered characteristic.
Figure 9A:
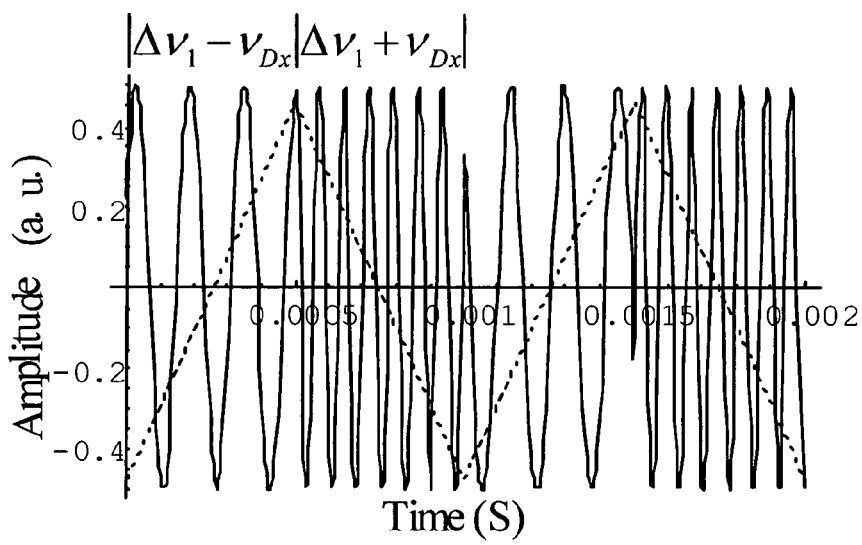
FIG. 9A is an example of the frequency wave of FIG. 9 with frequency shifts corresponding to the second altered characteristic of the light beam filtered out, thereby revealing a filtered Doppler waveform of the first altered characteristic.

The first filter 71 acts to filter out the frequency shifts corresponding to the second altered characteristic of the light beam E projected by the laser 27, thereby revealing a first filtered Doppler waveform of the first altered characteristic (FIGS. 8A and 9A). The first filtered Doppler waveform provides information to the controller 59 relating to the relative movement between the tracking surface 25 and the device 21 in the direction of the first light beam B. The first filtered Doppler waveform has a frequency related to the speed of any relative displacement between the tracking surface 25 and the device 21 in an azimuth direction generally along a first axis corresponding to the axis of the first light beam B as it strikes the tracking surface 25.

Figure 8B:
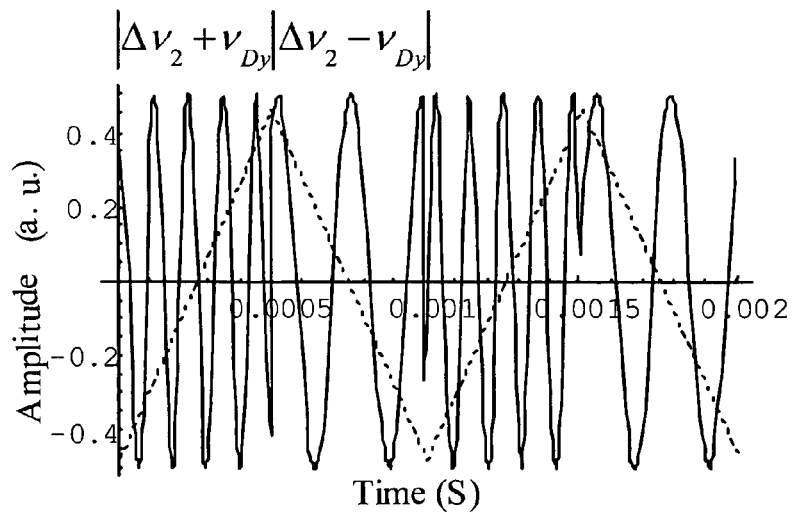
FIG. 8B is an example of the frequency wave of FIG. 8 with frequency shifts corresponding to the first altered characteristic of the light beam filtered out, thereby revealing a filtered Doppler waveform of the second altered characteristic.
Figure 9B:
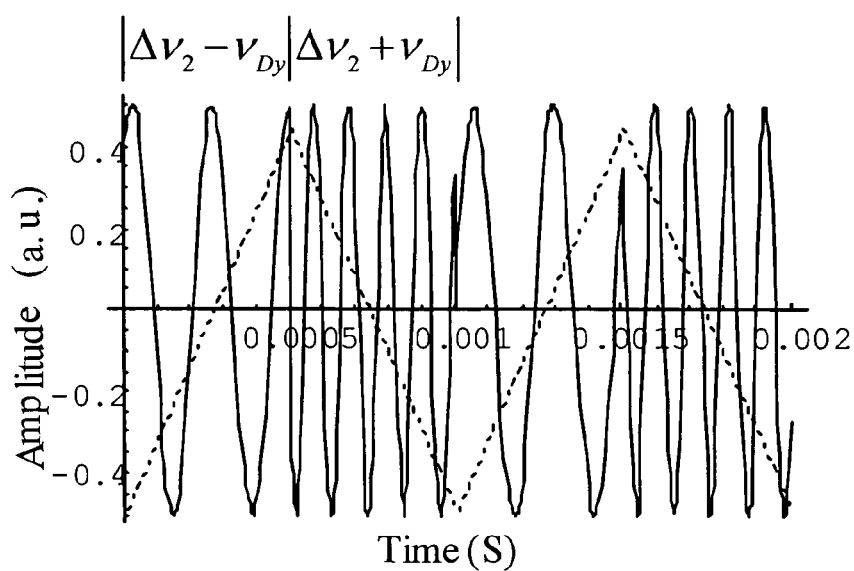
FIG. 9B is an example of the frequency wave of FIG. 9 with frequency shifts corresponding to the first altered characteristic of the light beam filtered out, thereby revealing a filtered Doppler waveform of the second altered characteristic.

Conversely, the second filter 73 acts to filter out the frequency shifts corresponding to the first altered characteristic of the light beam E projected by the laser 27, thereby revealing a second filtered Doppler waveform of the second altered characteristic (FIGS. 8B and 9B). The second Doppler waveform provides information to the controller 59 relating to the relative movement between the tracking surface 25 and the device 21 in the direction of the second light beam C. The second filtered Doppler waveform has a frequency related to the speed of any relative displacement between the tracking surface and the device in an azimuth direction generally along a second axis corresponding to the axis of the second light beam C as it strikes the tracking surface 25. With the information provided by the first and second Doppler waveforms, the relative movement of the device 21 and the tracking surfaces 25 may be ascertained by the controller 59, as is explained in detail below in Appendix A.

Referring again to FIGS. 8, 8A, 8B, 9, 9A, and 9B, the filtered waveforms may be reviewed to understand how the controller 59 determines the relative motion between the tracking surface 25 and the device 21. In particular, FIG. 8A depicts a filtered Doppler waveform of the first altered characteristic for a tracking surface 25 and device 21 having positive motion relative one another in the chosen reference frame. As the modulated frequency of the light beam increases over time in FIG. 8A, such as between 0 seconds and 0.0005 seconds, and also between 0.0010 seconds and 0.0015 seconds, the first filtered Doppler waveform of the projected light beam is defined as exhibiting a positive modulation signal frequency. Similarly, as the modulated frequency of the light beam increases over time in FIG. 8B, such as between 0 seconds and 0.0005 seconds, and also between 0.0010 seconds and 0.0015 seconds, the second filtered Doppler waveform of the projected light beam is defined as exhibiting a positive modulation signal frequency. Conversely, as the modulated frequency of the light beam decreases over time in FIG. 8A, such as between 0.0005 seconds and 0.0010 seconds, and also between 0.0015 seconds and 0.0020 seconds, the first filtered Doppler waveform of the projected light beam is defined as exhibiting a negative modulation signal frequency. Similarly, as the modulated frequency of the light beam decreases over time in FIG. 8B, such as between 0.0005 seconds and 0.0010 seconds, and also between 0.0015 seconds and 0.0020 seconds, the second filtered Doppler waveform of the projected light beam is defined as exhibiting a negative modulation signal frequency. The positive and negative designations associated with the modulation frequencies do not denote a positive or negative frequency value, but rather are used to define if the frequency is related to a positively or negatively sloping frequency modulation.

With the positive and negative modulation frequencies, one can compare the two to determine if the device 21 and tracking surface 25 are exhibiting positive or negative relative motion relative one another in the chosen reference frame. For example, a positive modulation signal frequency of one of the filtered Doppler waveforms greater than the negative modulation signal frequency of the same filtered Doppler waveform indicates that the tracking surface 25 and the device 21 are moving in a positive direction relative one another in an azimuth direction generally along the axis corresponding to the filtered Doppler waveform of the respective first and second beams B,C. With reference to a specific example, the Doppler waveform of FIG. 8A exhibits a positive modulation signal frequency of about 6.5 cycles per 0.0005 seconds, or 13 kHz. The Doppler waveform of FIG. 8A exhibits a negative modulation signal frequency of about 3 cycles per 0.0005 seconds, or 6 kHz. Because the positive modulation signal frequency is greater than the negative modulation signal frequency, the tracking surface 25 and the device 21 are moving in a positive direction relative one another in an azimuth direction generally along the axis corresponding to the first light beam B.

In the example of FIG. 8B, which corresponds to the second altered characteristic, the Doppler waveform exhibits a positive modulation signal frequency of about 4 cycles per 0.0005 seconds, or 8 kHz, and a negative modulation signal frequency of about 2 cycles per 0.0005 seconds, or 4 kHz. Again, because the positive modulation signal frequency is greater than the negative modulation signal frequency, the tracking surface 25 and the device 21 are moving in a positive direction relative one another in an azimuth direction generally along the axis corresponding to the second light beam C.

In the example of FIG. 9A, which corresponds to the first altered characteristic, the Doppler waveform exhibits a positive modulation signal frequency of about 3 cycles per 0.0005 seconds, or 6 kHz, and a negative modulation signal frequency of about 7 cycles per 0.0005 seconds, or 14 kHz. Here, in contrast to the examples of FIGS. 8A and 8B, the positive modulation signal frequency is smaller than the negative modulation signal frequency, such that the tracking surface 25 and the device 21 are moving in a negative direction relative one another in an azimuth direction generally along the axis corresponding to the first light beam B.

Finally, in the example of FIG. 9B, which corresponds to the second altered characteristic, the Doppler waveform exhibits a positive modulation signal frequency of about 2 cycles per 0.0005 seconds, or 4 kHz, and a negative modulation signal frequency of about 4.5 cycles per 0.0005 seconds, or 9 kHz. Here, the positive modulation signal frequency is smaller than the negative modulation signal frequency, such that the tracking surface 25 and the device 21 are moving in a negative direction relative one another in an azimuth direction generally along the axis corresponding to the second light beam C.

Thus, by systematically comparing the positive modulation signal frequency with the negative modulation signal frequency of each Doppler waveform, the direction of relative movement of the device 21 and tracking surface 25 may be ascertained. In addition, the positive and negative modulation signal frequencies are related to the speed of the relative movement between the tracking surface 25 and the device 21 along each respective axis. Therefore, by monitoring the relative magnitude of the two frequencies, the speed at which the relative movement is occurring may also be obtained.

The device 21 further comprises a housing 75 for containing and protecting the components of the device. For example, the single laser 27, the beam splitter 37, the detector 55, and the controller 59 are each associated with the housing. The housing 75 includes a support surface 77 adapted to contact the tracking surface 25 during a tracking mode of the device 21. The housing 75 may take any form, without departing from the scope of the claimed invention. For example, the housing 75 may be in the shape of a mouse, a trackball, an optical pen, or any other data input device 21. The housing 75 further comprises an aperture 79 covered by a transparent window 81 that allows the light beams B,C to pass through the housing and fall upon the tracking surface 25, while limiting the ability of dust and dirt to enter the housing.

Referring now to FIG. 5, a device 21 is depicted wherein the tracking surface 25 is human skin. In particular, the tracking surface 25 shown is a human finger. This device 21 demonstrates that the device itself may be stationary while the tracking surface 25 moves relative to the device. The functioning of the device components, such as the single laser 27, the detector 55 and the controller 59 are identical. A device 21 as depicted in FIG. 5 allows the user to move his hand, the tracking surface 25, over the device such that the detector 55 and controller 59 are able to detect relative movement.

The devices 21 of the present invention may be used as a data input devices for pointing with virtually any device or apparatus. The device 21 of the present invention may be formed integral with a keyboard, such that as the user utilizes the keyboard, the user may also manipulate the device to alter the location of a pointer on a display associated with the keyboard. In particular, the device 21 may be positioned adjacent a home position of a typing finger of the keyboard for ease of access to the device by a typing finger. Similarly, the device 21 may be integral with a laptop computer, such that as the user utilizes the laptop computer, the user may also manipulate the device to alter the location of a pointer on the display of the laptop computer. Such devices 21 are also particularly useful in handheld electronics, such as personal digital assistants, cellular phones, digital music players, as well as any other electronic device where it is desirable to locate a data input device on the device itself, for interaction with a tracking surface comprising human skin, such as a fingertip.

In another embodiment, the present invention may comprise a method of tracking relative movement on a tracking surface 25 having light scattering properties. In particular, one such method comprises modulating the frequency of a light beam A over time, the light beam being projected from a single laser cavity 31. The method also comprises splitting the light beam into a first light beam B and a second light beam C. The first light beam B is projected onto the tracking surface 25 along a first light path $L_1$, while the second light beam C is projected onto the tracking surface along a second light path $L_2$. At least a portion D of the first light beam B reflected by the tracking surface 25 along the first light path $L_1$ is received within the laser cavity 31, and at least a portion D of the second light beam C reflected by the tracking surface along the second light path $L_2$ is received within the laser cavity. The method also comprises mixing the received reflected light portions D with light generated within the laser cavity 31. Such mixing alters at least one first characteristic of the projected light beam A due to the received reflected portion D of the first light beam and alters at least one second characteristic of the projected light beam due to the received reflected portion of the second light beam. The method further comprises projecting a light beam E with the at least one first and at least one second altered characteristics from the laser cavity. At least one first altered characteristic of the projected light beam E is detected, as is the at least one second altered characteristic of the light beam. The method further determines movement of the tracking surface 25 and the single laser cavity 31 relative to one another as a function of the detected altered first and second characteristics. The method may further comprise altering data output of the data input device 21 as a function of the determined relative movement between the device and the tracking surface 25. In such a method, the detected at least one first and second altered characteristics of the light beam may comprise frequency.

In another embodiment, splitting the light beam A includes splitting the light beam into the first light beam B, the second light beam C, and a third light beam, similar to the first and second light beams. The method further comprises projecting the third light beam onto the tracking surface 25 along a third light path, such that at least a portion of the third light beam reflected by the tracking surface along the third light path is received within the laser cavity 31. As with the first and second light beams B,C, the received reflected light portions of the third light beam are mixed with light generated within the laser cavity 31, the mixing thereby altering at least one third characteristic of the projected light beam A due to the received reflected portion of the third light beam. Also as with the first and second altered characteristics, the at least one third altered characteristic of the light beam is detected. Because the reflected third light beam yields such a third characteristic, one may additionally determine the relative movement of the tracking surface 25 and the single laser cavity 31 relatively toward or away from one another as a function of the detected altered first, second, and third characteristics. By including a third light beam, the position of the device 21 with respect to the tracking surface 25 may be calculated, such that x-direction, y-direction, and z-direction movement may be determined. The method may further comprise determining the spatial separation between the tracking surface and the single laser cavity 31.

Such a method wherein the single laser cavity 31 is housed in a data input device 21 and, further comprising suspending tracking of relative movement between the device and the tracking surface 25 when the device is spatially separated from the tracking surface by at least a lift-off detection distance and (ii) maintaining tracking of relative movement between the device and the tracking surface when the device is spatially separated from the tracking surface by less than the lift-off detection distance. The separation of the device 21 from the tracking surface 25 is useful in determining if the device has been lifted from the tracking surface a sufficient distance to indicate lift-off, such that tracking may be suspended as would be expected by a user familiar with traditional tracking devices, such as a mouse or pressure-sensitive post, such as those commonly utilized in laptop computers.

It should be noted here that the terms "moving", "lift-off", or "lifting" the device 21 additionally comprise either lifting, or moving, the tracking surface 25 away from the stationary device (e.g., FIG. 5), or lifting the device away from the tracking surface (e.g., FIG. 1). In addition, referring to relative movement between the device 21 and the tracking surface 25 may comprise movement of the device (e.g., a mouse moving over a mouse pad), movement of the tracking surface (e.g., a moving trackball or human skin moving in the path of a laser light beam), or movement of both the tracking surface and the device.

Figure 10:
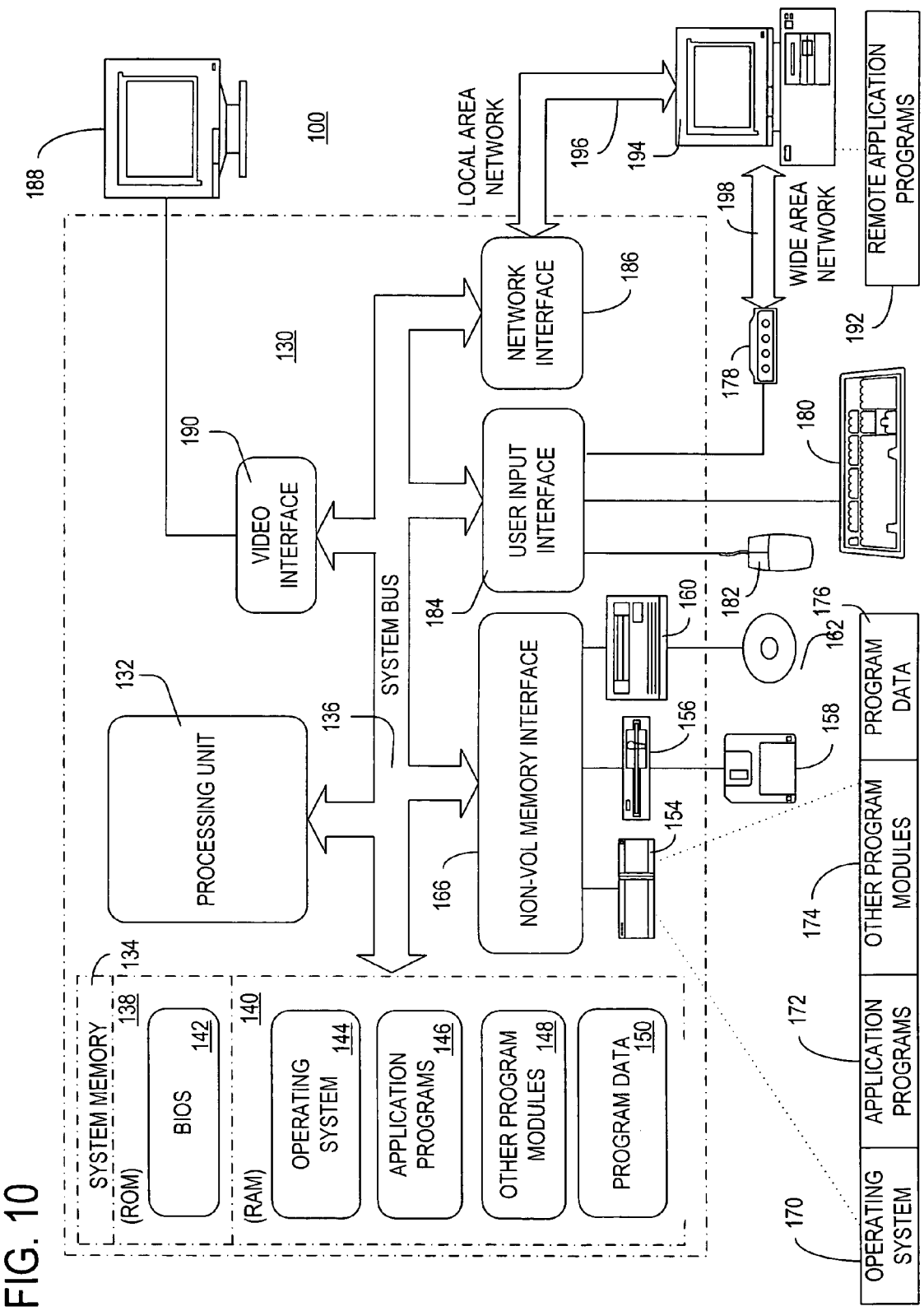
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

Appendix A

The relative movement between laser and target surface can be measured by measuring the component velocities $V_x$ and $V_y$, respectively. The single laser (e.g., EEL or VCSEL) is modulated by a triangular current. The self-mixing signals are processed by the electronic circuits of the controller, which include filter circuits and frequency counters. First, the filter or the differentiator demodulates the effects from the triangular current in the frequency measurement. Then, first and second filters pass the relevant beat frequencies from either the first or second optical path $L_1$ or $L_2$, separately into first and second counters. The first and second counters measure the frequency of the x-direction and y-direction Doppler signal, respectively, which relate to the velocity components $V_x$ and $V_y$.

The frequency characteristic of the self-mixing Doppler signal can be deduced by interference model of self-mixing effect. In the cavity of an EEL or VCSEL, the electric field component of the light reflected from the front facet can be written as $$E_1(t) = a \exp[-j2\pi v t], \tag{1-1}$$

where a is the initial electronic field, and $v$ is the light frequency without current modulation.

The electric field component of the feedback light in the front facet of an EEL or VCSEL through the first light path can be described by $$E_2(t) = b \exp\left[-j2\pi\left(v \pm \frac{2L_1\alpha}{c} + v_{Dx}\right)t\right], \tag{1-2}$$

and similarly the feedback light in the front facet of an EEL or VCSEL through the second light path can be described by $$E_3(t) = c \exp\left[-j2\pi\left(v \pm \frac{2L_2\alpha}{c} + v_{Dy}\right)t\right], \tag{1-3}$$

where b and c are the feedback coefficients through the first and second light paths $L_1$ and $L_2$, respectively. C is the speed of light in its propagation material, $\alpha$ is the frequency modulation coefficient of triangular current modulation in units of Hz/s, wherein a positive $\alpha$ indicates an upwardly sloping triangular current and a negative $\alpha$ indicates a downwardly sloping triangular current, $v_{Dx}$ and $v_{Dy}$ are x and y components of the Doppler frequency, wherein positive values of $v_{Dx}$ and $v_{Dy}$ indicate velocity toward the laser and negative values of $v_{Dx}$ and $v_{Dy}$ indicate velocity away from the laser.

Accordingly, the intensity of the emitted light with the feedback effect of self-mixing may be expressed as $$I(t) = a^2 + b^2 + c^2 + 2ab \cos\left[2\pi\left(\pm\frac{2L_1\alpha}{c} + v_{Dx}\right)t\right] + \tag{1-4}$$

$$2ac \cos\left[2\pi\left(\pm\frac{2L_2\alpha}{c} + v_{Dy}\right)t\right] +$$

$$2bc \cos\left[2\pi\left(\pm\frac{2L_1\alpha}{c} + v_{Dx} \mp \frac{2L_2\alpha}{c} - v_{Dy}\right)t\right],$$

Figure 11:
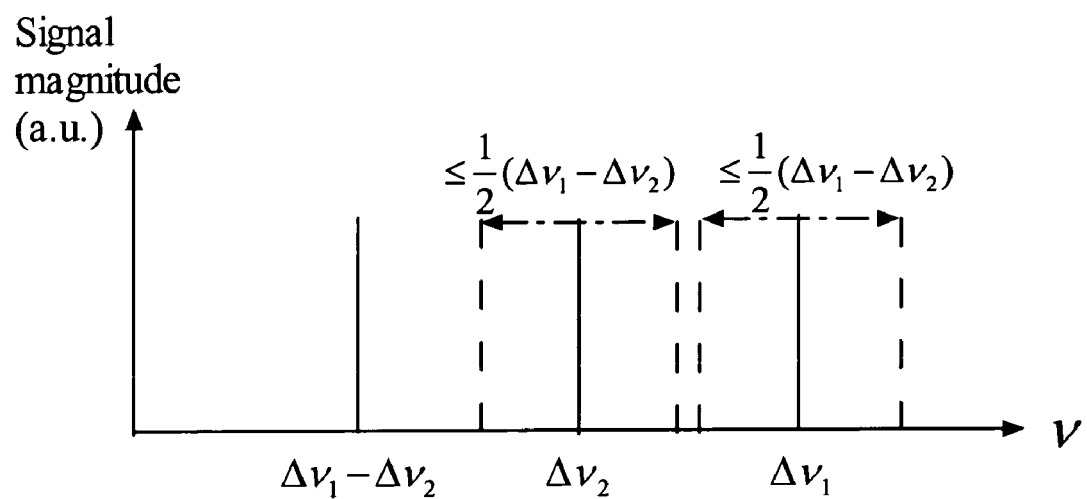
FIG. 11 is an example of a distribution of the different frequencies of the first and second optical paths.

Thus, optical paths $L_1$ and $L_2$ correspond to the different frequency ranges $\Delta v_1$ and $\Delta v_2$ depicted in FIG. 11, where $\Delta v_1 = 2L_1\alpha/c$, $\Delta v_2 = 2L_2\alpha/c$. Within each frequency band, Doppler signals of $v_{Dx}$ and $v_{Dy}$ can be obtained, respectively. As shown in equation 1-4, the intensity fluctuation includes x-direction and y-direction velocity information. The corresponding frequencies with $$\left|\pm\frac{2L_1\alpha}{c} + v_{Dx}\right| \text{ and } \left|\pm\frac{2L_2\alpha}{c} + v_{Dy}\right|$$

may be detected by electric processing circuits, respectively. The distribution of these frequencies is shown in FIG. 11 by a distribution of different frequencies of $v_{Dx}$, $v_{Dy}$ of first and second optical paths $L_1$ and $L_2$, respectively. The center frequencies of the first filter and second filter are located at $\Delta v_1$ and $\Delta v_2$ respectively, each having the same bandwidth, $$\leq \frac{1}{2}(\Delta v_1 - \Delta v_2).$$

Each of the first and second counters detects the frequencies in the up slope and the down slope respectively. The direction of the relative movement between the tracking surface and the device can be obtained by comparing the frequencies in the upward and downward slopes. The corresponding Doppler frequencies are $$v_{Dx} = \frac{1}{2}\left[\left(\frac{2L_1\alpha}{c} + v_{Dx}\right) - \left(\frac{2L_1\alpha}{c} - v_{Dx}\right)\right], \tag{1-5}$$

$$v_{Dy} = \frac{1}{2}\left[\left(\frac{2L_2\alpha}{c} + v_{Dy}\right) - \left(\frac{2L_2\alpha}{c} - v_{Dy}\right)\right], \text{ respectively.} \tag{1-6}$$

As a result, the 2-dimential velocity values and their directions can be obtained simultaneously. Moreover, the Doppler frequencies $v_{Dx}$ and $v_{Dy}$ can be calculated accurately. Moreover, if the first and second light paths $L_1$ and $L_2$ are varied slightly during the frequency measurement, the variance does not produce additional errors in measurement because the variance will be canceled out, as shown in the above expressions of $v_{Dx}$ and $v_{Dy}$.

The relationship between the triangular current modulation, first and second light path lengths, and the velocity ranges are key to the design of the device. According to FIG. 11, the two frequency ranges of $|\pm\Delta v_1 + v_{Dx}|$ and $|\pm\Delta v_2 + v_{Dy}|$ do not overlap, otherwise the frequencies $v_{Dx}$ and $v_{Dy}$ are not independently distinguishable. An appropriate ratio between $\Delta v_1$ and $\Delta v_2$ may be selected (e.g., 3:2) to ensure that the frequencies do not overlap for the given bandwidth of the first and second filters.

In the example shown, the first and second filters have the same bandwidth $$\leq \frac{1}{2}(\Delta v_1 - \Delta v_2)$$

whose center frequencies are separately located at $\Delta v_1$ and $\Delta v_2$. The bandwidth of the filters will determine the maximum detectable relative velocity between the device and the tracking surface. The maximum measurable magnitude for $V_x$ and $V_y$ are equal to $$V_{D \max} = \frac{\lambda}{4}(\Delta v_1 - \Delta v_2), \tag{1-7}$$

according to Doppler effect $$\left(v_D = \frac{2V}{\lambda}\right),$$

where $\lambda$ is the light wavelength of the light beam produced by the single laser.

The following is an example of such a maximum velocity calculation. Assuming that (i) the current modulation coefficient ($\eta$) of a single mode 850 nanometer (nm) (33.46 microinches) wavelength ($\lambda$) VCSEL (such as those available from Osram Opto Semiconductors GmbH of Regensburg, Germany) is about 0.3 nanometers/milliAmperes (nm/mA) (12 milliinches/milliAmperes), (ii) the Frequency of triangular current ($v_m$) is 1,000 Hertz (Hz) with an amplitude ($\Delta I$) of 2 mA, (iii) the typical useful maximum relative velocity between the device and the tracking surface is 500 millimeters/second (mm/s) (20 inches/second), and (iv) the speed of light (c) is $3\times10^8$ (m/s) ($10\times10^8$ feet/s), the frequency modulation coefficient $\alpha$, which corresponds to how quickly the frequency changes over time, can be calculated as follows:

$$\alpha = \frac{c}{\lambda^2} \cdot \eta \Delta I \cdot 2 v_m \qquad (1\text{-}8)$$

$$=(3\times10^8 \text{ m/s})\times(0.3 \text{ nm/mA})\times(2 \text{ mA})\times(2)\times(1,000 \text{ Hz})/$$
$$(850 \text{ nm})^2 = 4.98\times10^{14} \text{ Hz/s}$$

One can also calculate the maximum velocity measurable by such a device by assuming particular values for $\Delta v_1$, such as $\Delta v_1 = 9$ MHz, and $\Delta v_2$, such as $\Delta v_2 = 6$ MHz (maintaining the 3:2 ratio). Utilizing the following equation, which is derived from equation (1-7) above, $$V_{D\max} = \frac{\lambda}{2} \cdot \frac{1}{2}(\Delta v_1 - \Delta v_2), \qquad (1\text{-}9)$$

yields the following maximum velocity is measurable by the device.

$V_{Dmax} = (850 \text{ nm} \times (9-6) \text{ MHz}/(2\times 2) = 637.5$ mm/s (25.10 inch/second), which is acceptable considering the typical useful maximum velocity at 500 nm/s (20 inches/second).

Considering design of the device in terms of the proper ratio between $\Delta v_1$ and $\Delta v_2$ (e.g., 3:2), each frequency band around $\Delta v_1$, $\Delta v_2$, and $\Delta v_1 - \Delta v_2$ must be large enough to encompass $2V_{Dmax}$, which in this example is 1275 mm/s (50.20 inches/second). Therefore, the minimum frequency $\Delta v_1$ must be greater than six times Doppler frequency $V_{Dmax}$ to avoid frequency band overlap. In other words, the minimum length of the first light path $L_1$ is expressed in the following equation, derived from equation (1-9), $$L_{1\min} = 6 \cdot \frac{2V}{\lambda} \sin\theta \bigg/ \frac{2\alpha}{c} = 1.0625 \text{ m}, \qquad (1\text{-}10)$$

wherein V is 500 mm/s (20 inches/ second), the elevation angle $\theta$ of the light beam relative to the tracking surface is 0.52 radian (30 degrees), the frequency modulation coefficient $\alpha$ is $4.98\times10^{14}$ Hz/s, as calculated above, and c is the speed of light in the fiber, assuming a refractive index of 1.49 for a plastic fiber, yields the following minimum length for the first light path $L_{1min} = 6\times2\times(500 \text{ mm/s})\times(\sin (0.52 \text{ radian}))\times(3\times10^8$
$\text{m/s}/1.49 )/(2\times(4.98\times10^{14} \text{ Hz/s})\times850 \text{ nm})=0.713$
meters (m) (2.340 feet).

Thus, with a ratio between $\Delta v_1$ and $\Delta v_2$ of 3:2, $$L_{2\min} = \frac{2}{3}L_{1\min} = 0.4754 \text{ m}$$

(1.560 feet). In other examples not described here, these parameters maybe adjusted according to equation 1-10 without departing from the scope of the claimed invention.

Figure 7:
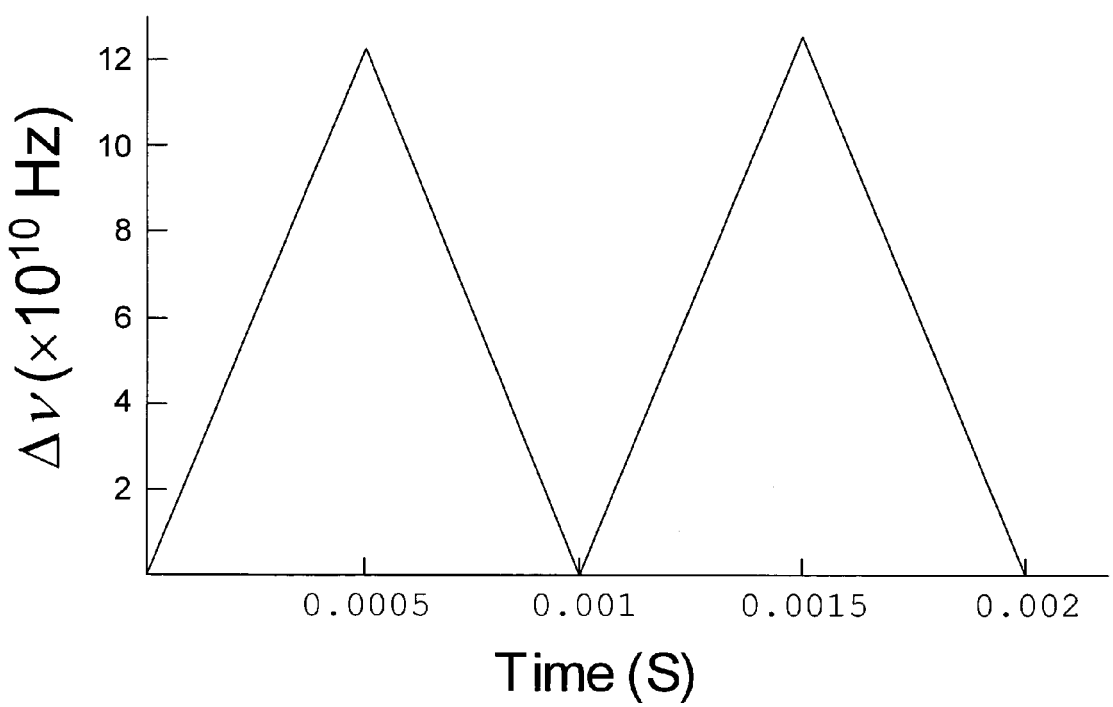
FIG. 7 is a graph depicting an example of a light beam modulated in a triangular, time-based pattern.

In another example, the frequency characteristic of self-mixing signals based upon equation 1-4 may be simulated. In this simulation, the light frequency fluctuation $\Delta v$ around initial light frequency is shown in FIG. 7 as a single laser modulated by a triangular current. The frequency of triangular current is set at 1000 Hz with an amplitude of 1 mA. The frequency modulation coefficient $\alpha$ of the EEL or VCSEL is $2.5\times10^{14}$ Hz/s. The first and second light path lengths $L_1$ and $L_2$ are set at 3 mm (0.12 inch) and 2 mm (0.08 inch), respectively. In this simulation, the component $V_x$ of velocity V is 1.56 mm/s (61.4 milliinches/s), and $V_y$ 1.04 mm/s (61.4 milliinches/s). It should be noted here that very small values of the above parameters are chosen here for more clearly demonstrating the characteristics of self-mixing. In other words, these small values ensure that the waveforms of FIGS. 8, 8A, 8B, 9, 9A, and 9B exhibit reasonable spacings between wave peaks and troughs for demonstrating the concepts utilized by the described device. FIGS. 8 and 9 demonstrate the amplitude of self-mixing signals obtained by this numerical simulation. The dashed lines included in the figures indicate the position of the modulated triangular current with respect to the self-mixing signal. In FIG. 8, the x and y components of velocity are in one-direction, whereas FIG. 9 shows the opposite direction. As seen in FIGS. 8 and 9, the waveforms are different if the direction of relative motion is reversed. Thus, the velocity direction can be discriminated by this characteristic of self-mixing signals.

The self-mixing signals depicted in FIGS. 8 and 9 contain frequencies $\pm\Delta v_1 + v_{Dx}$ and $\pm\Delta v_2 + v_{Dy}$ together, such that the characteristics of x-direction motion and y-direction motion are both included in the combined waveform. The first filter filters the signal from FIG. 8, filtering out frequencies $\pm\Delta v_2 + v_{Dy}$, as depicted in FIG. 8A, whereas the second filter filters the signal from FIG. 8, filtering out frequencies $\pm\Delta v_1 + v_{Dx}$, as depicted in FIG. 8B. Thus, as depicted in FIG. 8A, the frequencies of self-mixing signals during the up and down slopes of the triangular modulating current are different due to different frequencies $+\Delta v_1$ and $-\Delta v_1$. The waveforms of FIGS. 8A and 8B are different due to different frequencies $v_{Dx}$ and $v_{Dy}$. The self-mixing signals of FIG. 9 may be similarly filtered by the first and second filters to yield the signals depicted in FIGS. 9A and 9B, which relate to x-direction and y-direction signals, respectively. Comparing FIGS. 8A and 8B with FIGS. 9A and 9B, one finds that the self-mixing signals after the first and second filters are reversed if the corresponding movement of the device relative to the tracking surface is reversed. The amplitude fluctuation of the filtered signals of FIGS. 8A and 9A during upward and downward slopes of the triangular current remain related to frequencies $v_{Dx}$, whereas the amplitude fluctuation of the filtered signals of FIGS. 8B and 9B during upward and downward slopes of the triangular current remain related to frequencies $v_{Dy}$. Thus, the self-mixing signals after the first and second filters contain the information of velocity components $V_x$ and $V_y$, including velocity direction. One can thus obtain the velocity and its direction simultaneously by electronic processing circuits.

With respect to current modulation of the single laser, the light frequency of the single laser may be varied linearly with the injection current in triangular current modulation in order to obtain the frequency of self-mixing signal. Other current modulation schemes are also contemplated as within the scope of the claimed invention. Generally, the relationship between light frequency and driving current of an EEL or VCSEL is approximately linear in the operating region, without mode jump. The frequency modulation coefficient a tends to be larger in single-mode VCSELs than in multi-mode VCSELs and EELs, making the VCSEL a good choice because a larger frequency modulation coefficient a allows a larger measurable maximum velocity. In addition, mode jump should be avoided across the entire modulation current region. If the mode jumps, the linear modulation relationship will no longer hold. One means of avoiding mode jump is by properly selecting a current operation region for the laser.

It is important to note that temperature variations will not inhibit the functioning of such a device. In particular, temperature effect poses no influence on frequency differences $\Delta v_1$ and $\Delta v_2$, while temperature changes will affect on $v_{Dx}$ and $v_{Dy}$, which are each proportional to $\Delta\lambda/\lambda$. There is a finite temperature coefficient for light output wavelength from the VCSEL or the EEL. This effect is relatively small for a single mode VCSEL. For example, with a wavelength of $\lambda\sim850$ nm (33.46 microinches), even a relatively large $\Delta\lambda$ of about 4.2 nm (0.17 microinches) will yield an error about 0.5% to the measured value. Thus, temperature controls may not be needed.

What is claimed is:

1. A data input device for use with a tracking surface, said tracking surface having light-scattering properties with respect to said device, said device comprising:
   a single laser having a cavity from which a light beam is projected;
   a light beam modulator for modulating the frequency of the light beam over time;
   a beam splitter for splitting the modulated light beam into a first modulated light beam and a second modulated light beam;
   said beam splitter being configured to project the first modulated light beam onto said tracking surface along a first light path, at least a portion of the first modulated light beam striking said tracking surface and reflecting back into the cavity of said laser along said first light path and thereby altering at least one first characteristic of the projected modulated light beam,
   said beam splitter further being configured to project the second modulated light beam onto said tracking surface along a second light path, at least a portion of the second modulated light beam striking said tracking surface and reflecting back into the cavity of said laser along said second light path and thereby altering at least one second characteristic of the projected modulated light beam;
   a detector associated with the laser for detecting said altered first and second characteristics of the modulated light beam projected by the laser; and
   a controller responsive to the detector for determining the relative movement of the tracking surface and data input device relative to one another as a function of the altered first and second characteristics detected by the detector.

2. A device as set forth in claim 1 wherein said first modulated light beam travels a first distance between said beam splitter and said tracking surface and said second modulated light beam travels a second distance between said beam splitter and said tracking surface.

3. A device as set forth in claim 2 wherein said first and second distances are different from one another.

4. A device as set forth in claim 3 wherein said first distance is at least 1.2 times the second distance.

5. A device as set forth in claim 4 wherein said first distance is in a range from about 1.2 times to about 1.8 times the second distance.

6. A device as set forth in claim 5 wherein said first distance is in a range from about 1.4 times to about 1.6 times the second distance.

7. A device as set forth in claim 6 wherein said first distance is in a range from about 1.45 times to about 1.55 times the second distance.

8. A device as set forth in claim 2 further comprising a multi-reflection cell for increasing at least one of said first and second distances.

9. A device as set forth in claim 1 wherein said light beam modulator modulates said light beam in a time-based pattern.

10. A device as set forth in claim 9 wherein said time-based pattern comprises a triangular time-based pattern.

11. A device as set forth in claim 1 wherein said light beam modulator comprises a current modulator for modulating the current supplied to the laser.

12. A device as set forth in claim 11 wherein said current modulator modulates said current in a triangular pattern.

13. A device as set forth in claim 1 wherein said single laser comprises at least one of an edge-emitting laser (EEL) and a vertical cavity surface emitting laser (VCSEL).

14. A device as set forth in claim 1 wherein said beam splitter comprises at least two fiber optic strands, a first fiber optic strand carrying said first modulated light beam and a second fiber optic strand carrying said second modulated light beam.

15. A device as set forth in claim 14 further comprising an optic positioned between the fiber optic strands and the tracking surface for refracting the first and second modulated light beams between the tracking surface and the fiber optic strands.

16. A device as set forth in claim 1 wherein said first modulated light beam strikes said tracking surface at an azimuth angle relative to said second modulated light beam.

17. A device as set forth in claim 16 wherein said azimuth angle is between about 1.05 radians (60 degrees) and about 2.09 radians (120 degrees).

18. A device as set forth in claim 17 wherein said azimuth angle is about 1.57 radians (90 degrees).

19. A device as set forth in claim 1 wherein at least one of said first and second modulated light beams strikes said tracking surface at an elevation angle between about 0.17 radian (10 degrees) and about 1.40 radians (80 degrees).

20. A device as set forth in claim 19 wherein said elevation angle is between about 0.35 radian (20 degrees) and about 1.05 radians (60 degrees).

21. A device as set forth in claim 20 wherein said elevation angle is between about 0.35 radian (20 degrees) and about 0.79 radian (45 degrees).

22. A device as set forth in claim 21 wherein said elevation angle is about 0.52 radian (30 degrees).

23. A device as set forth in claim 1 wherein said first and second altered characteristics comprise frequency shifts in a Doppler waveform of the projected modulated light beam of the laser.

24. A device as set forth in claim 23 further comprising a first filter for filtering the Doppler waveform of the projected modulated light beam to filter out the frequency shifts corresponding to the second altered characteristic of the modulated light beam projected by the laser, thereby revealing a first filtered Doppler waveform of the first altered characteristic.

25. A device as set forth in claim 24 further comprising a second filter for filtering the Doppler waveform of the projected modulated light beam to filter out the frequency shifts corresponding to the first altered characteristic of the modulated light beam projected by the laser, thereby revealing a second filtered Doppler waveform of the second altered characteristic.

26. A device as set forth in claim 25 wherein said first filtered Doppler waveform has a frequency related to the speed of any relative displacement between the tracking surface and the device in an azimuth direction generally along a first axis corresponding to the axis of said first modulated light beam as it strikes said tracking surface, and said second filtered Doppler waveform has a frequency related to the speed of any relative displacement between the tracking surface and the device in an azimuth direction generally along a second axis corresponding to the axis of said second modulated light beam as it strikes said tracking surface.

27. A device as set forth in claim 26 wherein as the modulated frequency of the modulated light beam increases over time, the respective first and second filtered Doppler waveforms of said projected modulated light beam each exhibit a positive modulation signal frequency, and as the modulated frequency of the modulated light beam decreases over time, the respective first and second filtered Doppler waveforms of said projected modulated light beam each exhibit a negative modulation signal frequency, wherein a positive modulation signal frequency of one of said filtered Doppler waveforms greater than a negative modulation signal frequency of said one of said filtered Doppler waveforms indicates that the tracking surface and the device are moving in a positive direction relative one another in an azimuth direction generally along said axis corresponding to said one filtered Doppler waveform of said respective first and second beams, and wherein a positive modulation signal frequency of one of said filtered Doppler waveforms smaller than a negative modulation signal frequency of said one of said filtered Doppler waveforms indicates that the tracking surface and the device are moving in a negative direction relative one another in an azimuth direction generally along said axis corresponding to said one filtered Doppler waveform of said respective first and second beams.

28. A device as set forth in claim 27 wherein said positive and negative modulation signal frequencies are related to the speed of the relative movement between the tracking surface and the device along each respective axis.

29. A device as set forth in claim 1 further comprising a housing, said single laser, beam splitter, detector, and controller being associated with said housing.

30. A device as set forth in claim 29 wherein said housing is adapted to contact said tracking surface.

31. A device as set forth in claim 1 wherein said tracking surface comprises human skin.

32. A device as set forth in claim 1 wherein the detector associated with the laser monitors intensity of the laser.

33. A method of tracking relative movement on a tracking surface having light scattering properties, said method comprising:

modulating the frequency of a light beam over time, said light beam being projected from a single laser cavity;

splitting the modulated light beam into a first modulated light beam and a second modulated light beam;

projecting the first modulated light beam onto said tracking surface along a first light path;

projecting the second modulated light beam onto said tracking surface along a second light path;

receiving at least a portion of the first modulated light beam reflected by the tracking surface along the first light path within the laser cavity;

receiving at least a portion of the second modulated light beam reflected by the tracking surface along the second light path within the laser cavity;

mixing said received reflected light portions with light generated within said laser cavity, said mixing thereby altering at least one first characteristic of said projected modulated light beam due to said received reflected portion of the first modulated light beam and altering at least one second characteristic of said projected modulated light beam due to said received reflected portion of the second modulated light beam;

projecting a modulated light beam with said at least one first and at least one second altered characteristics from said laser cavity;

detecting said at least one first altered characteristic of the modulated light beam;

detecting said at least one second altered characteristic of the modulated light beam; and determining movement of the tracking surface and the single laser cavity relative to one another as a function of the detected altered first and second characteristics.

34. The method as set forth in claim 33 further comprising altering data output of the data input device as a function of the determined relative movement.

35. The method as set forth in claim 33 wherein said detected at least one first and second altered characteristics of the modulated light beam comprise frequency.

36. The method as set forth in claim 33 wherein splitting the modulated light beam includes splitting the modulated light beam into the first modulated light beam, the second modulated light beam, and a third modulated light beam and further comprising:

projecting the third modulated light beam onto said tracking surface along a third light path;

receiving at least a portion of the third modulated light beam reflected by the tracking surface along the third light path within the laser cavity;

mixing said received reflected light portions with light generated within said laser cavity, said mixing thereby altering at least one third characteristic of said projected modulated light beam due to said received reflected portion of the third modulated light beam;

detecting said at least one third altered characteristic of the modulated light beam; and determining the relative movement of the tracking surface and the single laser cavity relatively toward or away from one another as a function of the detected altered first, second, and third characteristics.

37. The method as set forth in claim 36 further comprising determining the spatial separation between the tracking surface and the single laser cavity.

38. The method as set forth in claim 37 wherein the single laser cavity is housed in a data input device and further comprising (i) suspending tracking of relative movement between said device and said tracking surface when said device is spatially separated from said tracking surface by at least a lift-off detection distance and (ii) maintaining tracking of relative movement between said device and said tracking surface when said device is spatially separated from said tracking surface by less than said lift-off detection distance.

* * * * *